United States Patent [19]
Tachibana et al.

[11] Patent Number: 5,886,970
[45] Date of Patent: Mar. 23, 1999

[54] MULTIPLE FOCAL LENS MULTIPLE FOCAL OPTICAL PICKUP AND OPTICAL INFORMATION REPRODUCING APPARATUS

[75] Inventors: Akihiro Tachibana, Tsurugashima; Akira Miura; Toshihiko Kurihara, both of Tokorozawa, all of Japan

[73] Assignee: Pioneer Electronic Corporation, Tokyo, Japan

[21] Appl. No.: 791,316

[22] Filed: Jan. 30, 1997

[30] Foreign Application Priority Data

Jan. 31, 1996 [JP] Japan ................... 8-015931

[51] Int. Cl.⁶ .................................. G11B 7/00
[52] U.S. Cl. ............... 369/112; 369/44.23; 369/109
[58] Field of Search ............... 369/44.23, 44.14, 369/44.37, 44.38, 112, 110, 109, 94

[56] References Cited

U.S. PATENT DOCUMENTS

| | | | |
|---|---|---|---|
| 5,526,336 | 6/1996 | Park et al. | 369/94 |
| 5,526,338 | 6/1996 | Hasman et al. | 369/112 |

FOREIGN PATENT DOCUMENTS 0 610 055 A2  8/1994  European Pat. Off. .

Primary Examiner—Thang V. Tran
Attorney, Agent, or Firm—Morgan, Lewis & Bockius LLP

[57] ABSTRACT

A multiple focal lens is provided with: a diffraction element having a light incident surface and a light outgoing surface for diffracting a light beam incident from the external to the light incident surface and generating a plurality of diffraction light beams from the light outgoing surface; a light condense element for condensing the generated diffraction light beams respectively onto a plurality of focal points different in position from each other; and a main body for holding said diffraction element and said light condense element. A central axis of said diffraction element and a central axis of said light condense element are offset to each other such that one optical path of one reflection light, which is used for reproducing information, among a plurality of reflection lights of the condensed diffraction light beams reflected from an information record medium on which the information to be reproduced is recorded, and the other optical paths of the other reflection lights among the plurality of reflection lights are offset to each other.

18 Claims, 11 Drawing Sheets

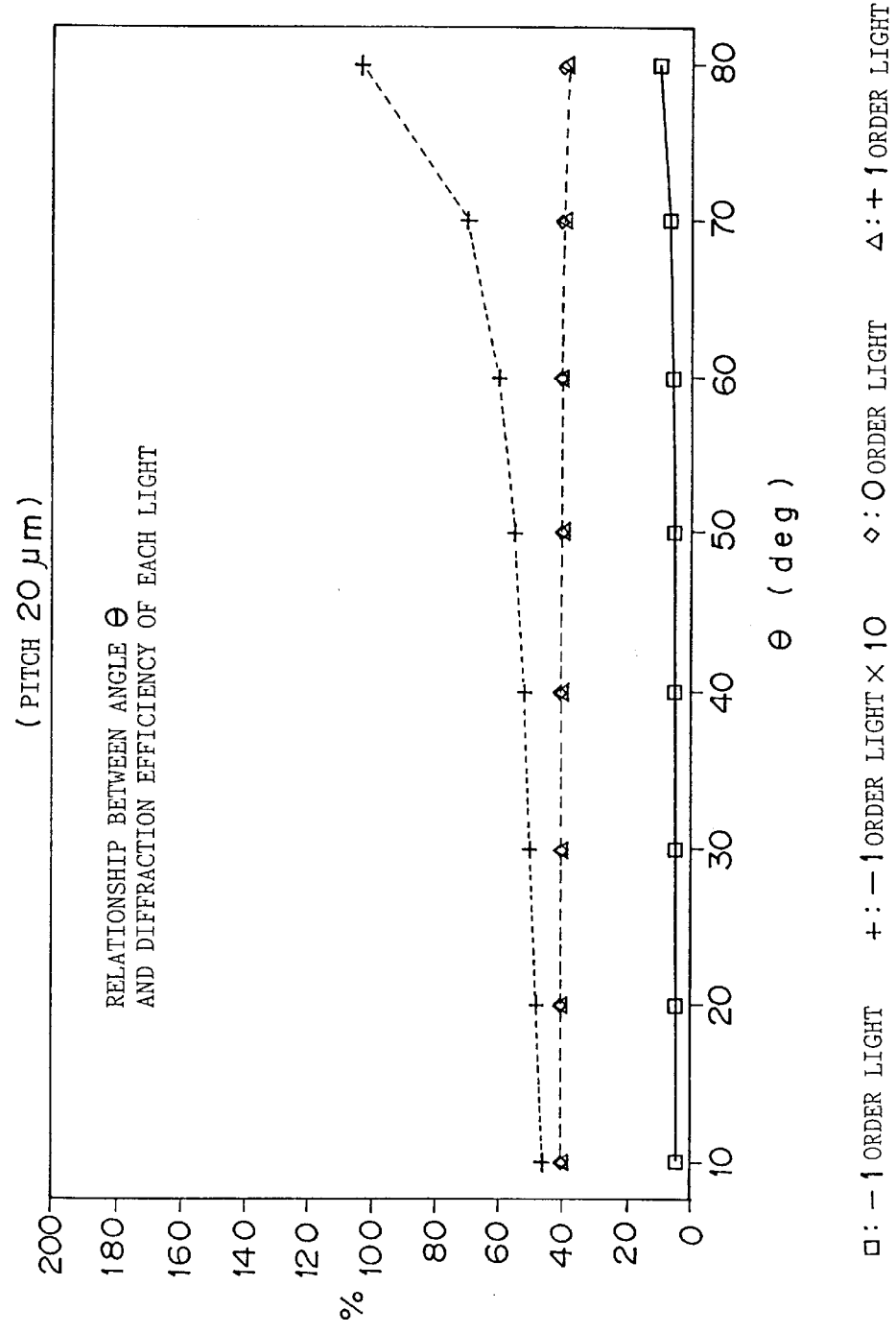

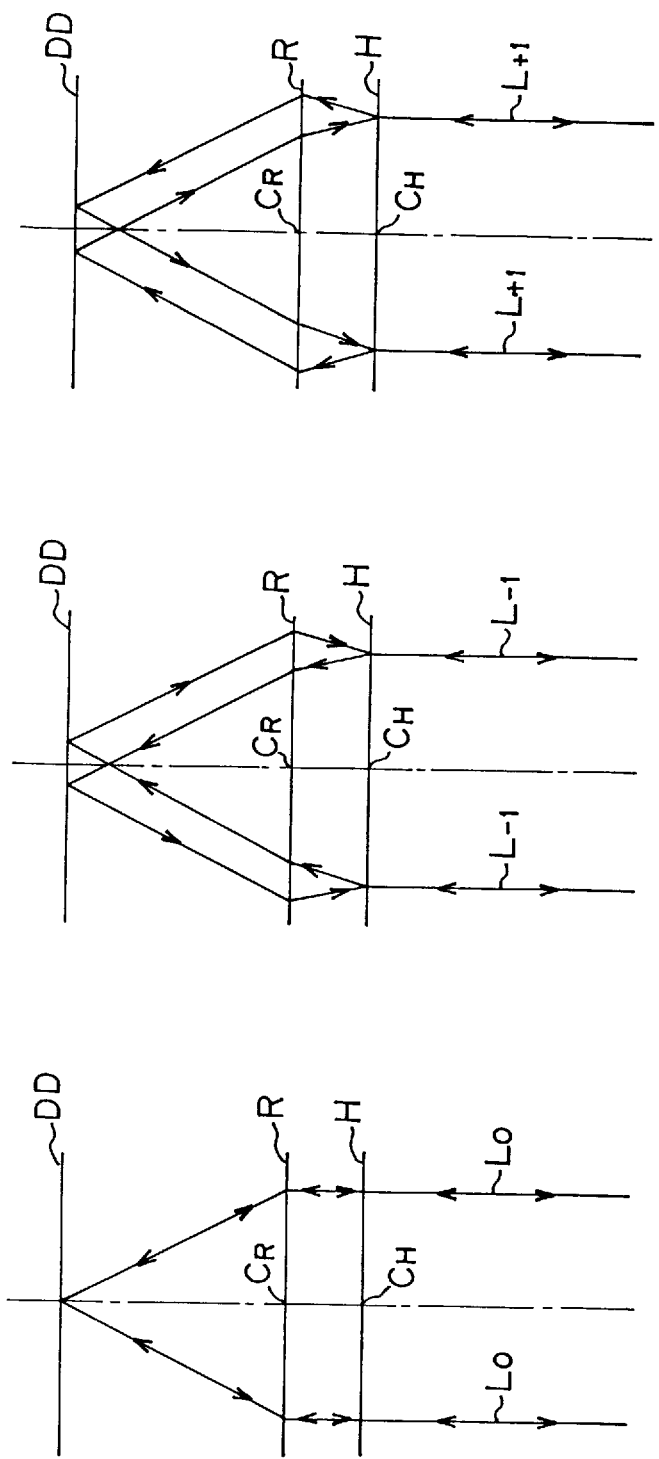

MULTIPLE FOCAL LENS MULTIPLE FOCAL OPTICAL PICKUP AND OPTICAL INFORMATION REPRODUCING APPARATUS

BACKGROUND OF THE INVENTION

1. Field of the Invention

The present invention generally relates to an optical pickup for irradiating a light beam as an information reproducing light onto an information record medium such as an optical disk, on which information is recorded by a phase pit or is magnetically recorded, and reproducing the information by detecting the reflection light from the information record medium. More particularly, it is related to a construction of an objective lens portion for condensing or focusing the light beam to form a light spot having an optimum size on a reproduction position of the information record medium.

2. Description of the Related Art

There is a so-called CD (Compact Disk)/LD (Laser Disk) compatible player, which can reproduce both of the CD and LD by a single player. In this CD/LD compatible player, the distance from a surface of the disk to the information record surface (i.e. the thickness of the protection layer) of the CD is the same as that of the LD (commonly 1.2 mm). Thus, by use of a single optical pickup for condensing or focusing the light beam onto a focus position, it is possible to reproduce both of these two types of optical disks.

There is a DVD (Digital Video or Versatile Disk) as a high density record medium, in which the memory capacity is drastically improved as compared with the conventional CD, and to which one movie etc. can be recorded. Thus, it is desirable to develop a CD/DVD compatible player which can reproduce both of the DVD and the CD.

Here, comparing the constructions of the CD and DVD, the thickness of the protection layer of the DVD is about half of the CD (i.e. 0.6 mm) because of the requirement for the high recording density. Therefore, if both types of these disks are tried to be reproduced by use of the optical pickup of single focal type, for example, if the light beam is condensed or focused optimally for the DVD, there is generated an aberration such as a spherical aberration of the light beam with respect to the CD since the protection layer of the CD where the light beam is passing through is thicker than the DVD. This results in a problem that the light beam cannot be optimally condensed or focused with respect to the CD.

Further, the CD and the DVD are different from each other in the size of the information pit formed for recording the information (more concretely, the length of the shortest pit of the information pit of the CD is about 0.87 $\mu$m, while the length of the shortest pit of the DVD is about 0.4 $\mu$m). Thus, in order to precisely read the information pits of these two types of disks, it is necessary to form a light spot on the CD or the DVD, which has an optimum size with respect to the size of the information pit of either type of the disks to be reproduced.

Here, the size (diameter) of the light spot is proportional to the ratio of the wavelength of the light beam with respect to the numerical aperture of the objective lens for condensing or focusing the light beam onto the information record surface. Namely, assuming that the wavelength of the light beam is set to be constant, as the numerical aperture is increased, the size of the light spot is decreased. Therefore, in case that the CD and the DVD are reproduced by an optical pickup of single focal type, if the wavelength of the light beam is set to be constant and the numerical aperture is set to be suitable for the information pit of the DVD, for example, the light spot becomes so small for the information pit of the CD as to cause a distortion in the reproduced signal of the CD, so that it is difficult to precisely read the information pit of the CD, which is another problem.

Therefore, in order to solve the above explained problems, there is an optical pickup of bifocal type provided with a bifocal lens capable of irradiating two light beams to be focused on one straight line at different positions and forming two light spots, which have sizes suitable for the information pits of the CD and the DVD respectively. This bifocal lens is explained here in detail.

The bifocal lens is constructed by disposing a diffraction element and an objective lens on one optical axis. The bifocal lens separates the light beam, which is emitted by a laser diode, is reflected by a half mirror and is made to be a collimated light beam by the collimator lens, into three lights i.e. the 0 order light and the ±1 order lights, by the diffraction element, and focuses the 0 order light and the +1 order light on different positions from each other on the same optical axis by use of the optical property that the focal length of the 0 order light and the focal length of the +1 order light are different from each other. At this time, out of the light beam, a component which has passed through the diffraction element becomes the 0 order light, while a component which has diffracted by the diffraction pattern of the diffraction element becomes the +1 order light.

More concretely, as for the focal position, the bifocal lens is constructed such that the +1 order light is focused at a farther position from the objective lens than the 0 order light, and that the 0 order light is optimally condensed or focused at the information record surface of the DVD, while the +1 order light is optimally condensed or focused at the information record surface of the CD.

Here, the diffraction pattern to form the +1 order light out of the light beam is formed within a smaller area than the aperture of the objective lens (i.e. the input area of the light beam). Thus, the diffraction does not occur at the portion of the diffraction element where the diffraction pattern is not formed, so that all of the light beam incident to this portion become a transmitted light (i.e. the 0 order light). By this construction, it is possible to increase the numerical aperture with respect to the 0 order light (i.e. the light beam for the DVD) while it is possible to decrease the numerical aperture with respect to the +1 order light to be the numerical aperture suitable for the CD, since the +1 order light is generated only in the area where the diffraction pattern is formed. In other words, the diffraction pattern is formed in the area having the numerical aperture (NA) corresponding to the size of the light spot by which the information from the CD can be precisely read.

By use of this bifocal lens, it is possible to reproduce both of the CD and DVD by use of a single optical pickup.

Here, in the above described bifocal lens, the diffraction element and the objective lens are disposed on the same optical path, in order to form the bifocal lens by using the diffraction element and the objective lens as a single lens.

On the other hand, as shown in FIG. 8 showing a partial cross-section view of a diffraction element, the diffraction element used for the above described bifocal lens is provided with: a diffraction area (the diffraction pattern), where a plurality of diffraction surfaces are coaxially formed; and a transmission area, which is formed at an outer circumference side of the diffraction area and where the incident light beam L is transmitted as it is. The diffraction surfaces HR are connected to each other by stepped surfaces HC which form the stepped portions. The cross-sectional shape of the diffraction surfaces HR and the stepped surfaces HC is such a saw-tooth shape that the stepped surfaces HC are substantially perpendicular to an incident surface HI on the side to which the light beam L is incident. The production of this diffraction element H is performed by forming the diffraction surfaces HR directly onto the material of the diffraction element H by use of a diamond cutter, or by forming a die, which has a shape corresponding to the diffraction surfaces HR, and molding the material of the diffraction element H such as resin, polymer etc. into the die.

However, considering the case where the information recorded on the DVD is reproduced by use of the above explained bifocal lens, the +1 order light, the −1 order light and the higher order lights, which are not necessary for the reproduction of the information form the DVD, are generated other than the 0 order light, which is necessary for the reproduction of the information form the DVD, at the diffraction area of the diffraction element H. Since the center of the diffraction element H and the center of the objective lens R are disposed on the same optical path to each other, the reflection lights of these ±1 order lights and the higher order lights from the optical disk are condensed at a position same as the reflection light of the 0 order light, on the photo-detector within the optical pickup of bifocal type.

This point is explained in more detail with referring to FIGS. 9A to 9C. In FIGS. 9A to 9C, the central axis of $C_R$ of an objective lens R and the central axis $C_H$, of the diffraction element H are made coincident to each other, and each of the lens surface of the objective lens R and the diffraction element H is indicated by a single line respectively, for the simplicity of the explanation.

As shown in FIG. 9A, if the 0 order light $L_0$ arrives at an information record surface DD of the DVD, it is reflected by the information record surface DD, passes through the same optical path as before arriving at the information record surface DD, and is further reflected to the photo-detector. However, in this case, as shown in FIG. 9B, after the −1 order light $L_{-1}$ is reflected by the information record surface DD, it passes through the same optical path as the incident light of the +1 order light, arrives at the light diffraction element H, is diffracted by the diffraction element H, and arrives at the photo-detector through the same optical path as the 0 order light $L_0$.

In the same manner, as shown in FIG. 9C, after the +1 order light $L_{+1}$ is reflected by the information record surface DD, it passes through the same optical path as the incident light of the −1 order light, arrives at the light diffraction element H, is diffracted by the diffraction element H, and arrives at the photo-detector through the same optical path as the 0 order light $L_0$. Consequently, the component based on the reflection lights of the ±1 order lights $L_{-1}$ and $L_{+1}$ and the higher order lights are mixed as the noise component into the detection signal based on the reflection light of the 0 order light $L_0$ to be detected as the genuine signal.

Here, assuming that the diffraction efficiencies for the 0 order light $L_0$ and the +1 order light $L_{+1}$ are 40%, and that the diffraction efficiency of the −1 order light $L_{-1}$ is 4%, the light intensity of the refection light of the 0 order light $L_0$ to be detected as the genuine signal is about 16% with respect to the original light beam L, while that of the other lights which should not be detected is about 3.2%. Namely, the light intensity ratio of the reflection light to be detected as the genuine signal with respect to the other reflection lights is 5:1. Thus, the detection signal component based on the reflection lights other than the 0 order light $L_0$, which should not be detected, becomes the noise in the RF (Radio Frequency) signal based on the detection signal during the generation of the RF siganl, and becomes a cause of making the focus servo control (pulling-in of the focus servo etc.) unstable.

On the other hand, since the above explained diffraction element H is constituted of the diffraction area (the diffraction pattern) and the transmission area, the light intensity of the transmitted light (i.e. the 0 order light $L_0$) as the light beam corresponding to the thickness of the protection layer of the DVD is drastically decreased at the time of transmitting through the diffraction area as shown in FIG. 10A, at a time of reproducing the information from the DVD. As a result, as shown in FIG. 10B, each side lobe of the light beam for the DVD which is condensed on the DVD through the objective lens R becomes large, so that it gives undesirable influence onto the focusing condition of the main lobe on the DVD, and the reproduced signal from the DVD is certainly degraded, which is another problem.

Further, since, on the cross-sectional shape of the above explained diffraction element H, the stepped portion HC is substantially vertical shape with respect to the incident surface HI as shown in FIG. 8, the use of a sharp edged blade (e.g. a bite) B' as shown in FIG. 11 is necessary for forming the diffraction element H. Thus, there is another problem that the edge of the blade B' can be easily broken, the operation efficiency is considerably low and it becomes the safety hazard. Furthermore, since a protruding portion P' of the saw-tooth shaped portion is sharpened, the diffraction element H formed in this manner can be easily broken at this protruding portion P', which is another problem.

SUMMARY OF THE INVENTION

It is therefore an object of the present invention to provide a multiple focal lens such as a bifocal lens, an optical pickup of multiple focal type equipped with the multiple focal lens, and an optical information reproducing apparatus equipped with the optical pickup, which can reduce the detection of the unnecessary reflection light such as the ±1 order diffraction light and the higher order diffraction lights on the photo-detector at a time of reproducing the information from the DVD, while reducing the side lobe of the light beam for the DVD.

The above object of the present invention can be achieved by a first multiple focal lens provided with: a diffraction element having a light incident surface and a light outgoing surface for diffracting a light beam incident from the external to the light incident surface and generating a plurality of diffraction light beams from the light outgoing surface; a light condense element for condensing the generated diffraction light beams respectively onto a plurality of focal points different in position from each other; and a main body for holding the diffraction element and the light condense element. A central axis of the diffraction element and a central axis of the light condense element are offset to each other such that one optical path of one reflection light, which is used for reproducing information, among a plurality of reflection lights of the condensed diffraction light beams reflected from an information record medium on which the information to be reproduced is recorded, and the other optical paths of the other reflection lights among the plurality of reflection lights are offset to each other.

According to the first multiple focal lens of the present invention, a light beam, such as a laser beam, incident to the light incident surface from the external is diffracted by the diffraction element, such as an HOE (Holographic Optical Element), and a plurality of diffraction light beams are generated from the light outgoing surface. Then, the generated diffraction light beams are condensed by the light condense element, such as an objective lens, respectively onto a plurality of focal points different in position from each other. The diffraction element and the light condense element are held by the main body as following. Namely, the central axis of the diffraction element and the central axis of the light condense element are offset to each other such that one optical path of one reflection light used for reproducing the information, and the other optical paths of the other reflection lights not used for reproducing the information are offset to each other. Thus, said one reflection light used for reproducing the information and the other reflection lights not used for reproducing are not overlapped on each other at a light receiving device. Consequently, the harmful influence of the other reflection lights, as the stray lights or noises for said one reflection light used for reproducing the information, can be eliminated from the information reproduction based on said one reflection light used for reproducing the information.

In one aspect of the first multiple focal lens of the present invention, the information record medium is a DVD (Digital Video or Versatile Disk).

According to this aspect, said one reflection light used for reproducing the information and the other reflection lights not used for reproducing are not overlapped on each other at a light receiving device in case of reproducing the DVD.

In another aspect of the first multiple focal lens of the present invention, the central axis of the diffraction element is offset to the central axis of the light condense element such that irradiation positions of the other reflection lights are outside of a light receiving area of an external light receiving means for receiving said one receiving light.

According to this aspect, the other reflection lights not used for reproducing are not inputted to the light receiving device, so that the harmful influence of the other reflection lights, as the stray lights or noises for said one reflection light used for reproducing the information, can be eliminated from the information reproduction.

In another aspect of the first multiple focal lens of the present invention, the diffraction element comprises, at the light outgoing surface, a plurality of diffraction surfaces and a plurality of stepped surfaces respectively connecting said plurality of diffraction surfaces, such that a cross-sectional profile of the light outgoing surface is in a saw-tooth shape. Each of said stepped surfaces is inclined, in the cross-sectional profile, around a protruding portion of the saw-tooth shape as a center respectively in a direction opposite to one of the diffraction surfaces connected to each of said stepped surfaces at the protruding portion, such that an angle between a straight line, which is included in each of said stepped surface passing through the protruding portion, and a straight line perpendicular to the light incident surface is a predetermined angle $\theta$ ($\theta>0$).

According to this aspect, in case of directly cutting the diffraction surfaces and the stepped surfaces by means of the mechanical cutting method etc., or in case of forming a die, which has a shape corresponding to the diffraction surfaces and the stepped surfaces by means of the mechanical cutting method etc., and molding the material of the diffraction element such as resin, polymer etc. into the die, it is not necessary to use a sharp edged blade (e.g. a sharp edged bite) for the cutting operation. Thus, it is possible to reduce the possibility of breaking or cracking the tip portion of the blade or bite, resulting in the improvement in the safety and the efficiency of the production operation of the diffraction element. Further, since the protruding portion of the saw-tooth shape is not sharpened, it is also possible to reduce the possibility of breaking or cracking the light outgoing surface of the diffraction element itself.

In another aspect of the first multiple focal lens of the present invention, said light condense element condenses the generated plurality of light beams onto two focal points.

According to this aspect, it is possible to reproduce two different types of information record mediums (including the above mentioned information record medium), which distances form the external surfaces thereof to the information record surfaces thereof are different from each other, by use of a single multiple focal lens.

The above object of the present invention can be also achieved by a second multiple focal lens provided with: a diffraction element having a light incident surface and a light outgoing surface for diffracting a light beam incident from the external to the light incident surface and generating a plurality of diffraction light beams from the light outgoing surface; a light condense element for condensing the generated diffraction light beams respectively onto a plurality of focal points different in position from each other; and a main body for holding said diffraction element and said light condense element. The diffraction element is provided with: a first diffraction area having a size corresponding to a numerical aperture for reproducing information from a first information record medium, on which the information to be reproduced is recorded; a second diffraction area included in said first diffraction area and having a size corresponding to a numerical aperture for reproducing information from a second information record medium, on which the information to be reproduced is recorded and which distance from an external surface thereof to an information record surface thereof is different from that of said first information record medium; and a third diffraction area, which is other than said second diffraction area in said first diffraction area. The second and third diffraction areas have diffraction patterns different from each other such that a light intensity difference between a light intensity of a diffraction light, which is generated from said third diffraction area and which is used for reproducing the information from said first information record medium, and a light intensity of a reflection light of a diffraction light, which is generated from said second diffraction area, is smaller than a predetermined value which gives an influence on reproducing the information from said first information record medium.

According to the second multiple focal lens of the present invention, a light beam, such as a laser beam, incident to the light incident surface from the external is diffracted by the diffraction element, such as an HOE (Holographic Optical Element), and a plurality of diffraction light beams are generated from the light outgoing surface. Then, the generated diffraction light beams are condensed by the light condense element, such as an objective lens, respectively onto a plurality of focal points different in position from each other. At this time, in the diffraction element, there are provided the first diffraction area for reproducing information from the first information record medium such as a DVD, the second diffraction area included in said first diffraction area for reproducing the information from the second information record medium such as a CD, and the third diffraction area included in said first diffraction area other than said second diffraction area. The second and third diffraction areas have diffraction patterns different from each other, such that the light intensity difference between the light intensity of the reflection light through said second diffraction area, and the light intensity of the reflection light through said third diffraction area, is smaller than the predetermined value. Consequently, since this light intensity difference does not give the influence onto reproducing the information from said first information record medium, the information can be precisely reproduced on the basis of the reflection light of the diffraction light diffracted by said first diffraction area including the second and third diffraction area.

The above object of the present invention can be also achieved by a multiple focal optical pickup provided with: the above described first or second multiple focal lens of the present invention; a light emitting means for emitting a light beam and irradiating an information record medium, on which the information to be reproduced is recorded, with the emitted light beam through said multiple focal lens; and a light receiving means for receiving a reflection light from said information record medium through said multiple focal lens, and generating a light detection signal corresponding to the received reflection light.

According to the multiple focal optical pickup of the present invention, the light beam is emitted by the light emitting means, such as a laser diode, and the information record medium is irradiated with the emitted light beam through the above descried multiple focal lens of the present invention. Then, the reflection light is received by the light receiving device, such as a photo-detector, from the information record medium through the above described multiple focal lens of the present invention. Then, the light detection signal is generated by the light receiving device in correspondence with the received reflection light. Thus, there is no harmful influence of the other reflection lights, as the stray lights or noises, onto the light detection signal, so that the noise can be reduced in the light detection signal, and that the servo operation based on the light detection signal can be performed in stable.

The above object of the present invention can be also achieved by an optical information reproducing apparatus provided with: the above described multiple focal optical pickup of the present invention; and a reproduction unit for reproducing the information on the basis of the generated light detection signal.

According to the optical information reproducing apparatus of the present invention, when the light detection signal is generated by the light receiving device in correspondence with the received reflection light, the information is reproduced by the reproduction unit on the basis of the generated light detection signal. Thus, since the noise can be reduced in the light detection signal and since the servo operation based on the light detection signal can be performed in stable, the information can be precisely reproduced according to the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 7 is a graph showing a relationship between an angle $\theta$ and a diffraction efficiency of each light beam in the embodiment;

FIG. 9A is a diagram indicating an optical path of the 0 order light $L_0$ at a time of reproducing the information from the DVD by the bifocal lens;

FIG. 9B is a diagram indicating an optical path of the $-1$ order light $L_{-1}$ at a time of reproducing the information from the DVD by the bifocal lens;

FIG. 9C is a diagram indicating an optical path of the $+1$ order light $L_{+1}$ at a time of reproducing the information from the DVD by the bifocal lens;

DETAILED DESCRIPTION OF THE PREFERRED EMBODIMENTS

Referring to the accompanying drawings, embodiments of the present invention will be now explained with referring to FIGS. 1 to 7.

Figure 1A:
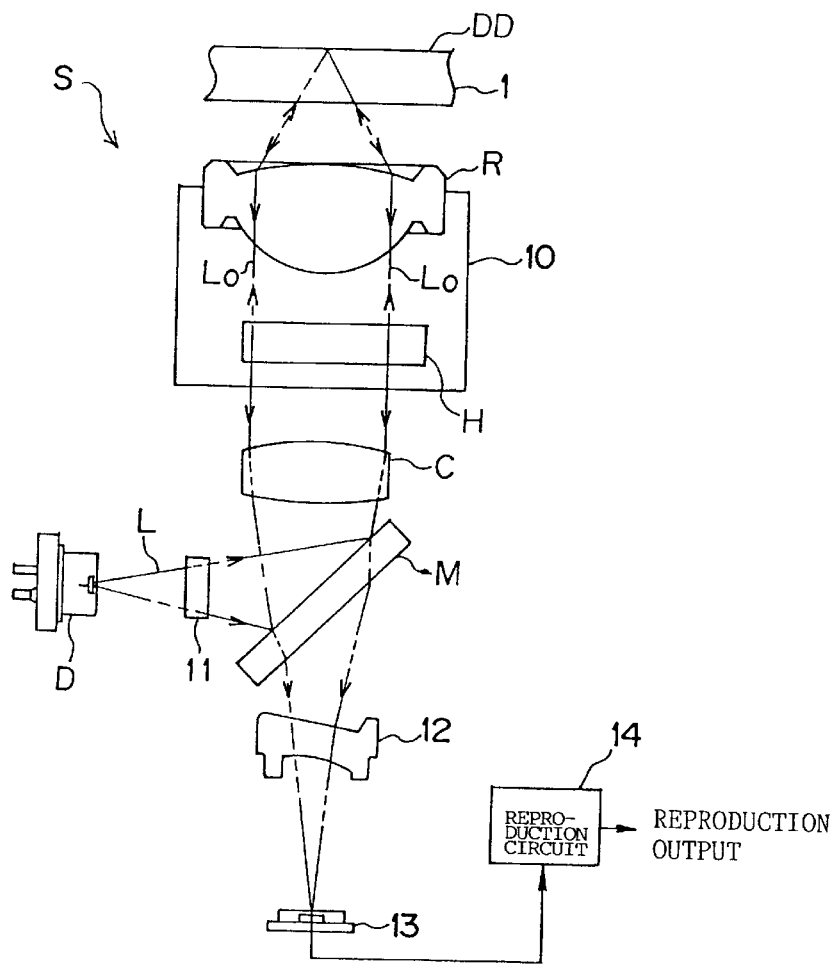
FIG. 1A is a schematic diagram of an optical information reproducing apparatus as an embodiment of the present invention.
Figure 1B:
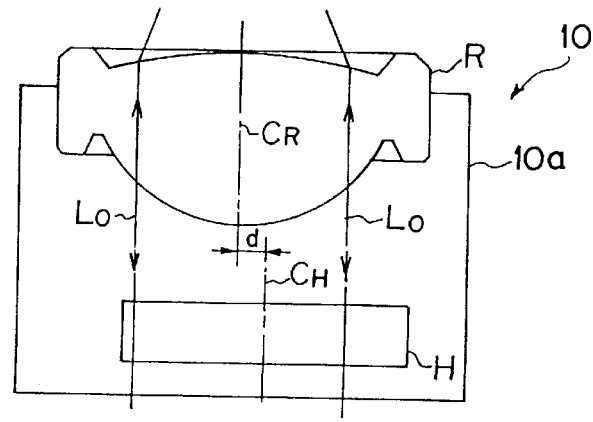
FIG. 1B is a schematic cross-sectional view of a bifocal lens used in the optical information reproducing apparatus of FIG. 1A.

First of all, a construction of an optical information reproducing apparatus as an embodiment of the present invention is explained by use of FIGS. 1A and 1B. In FIG. 1A, an optical information reproducing apparatus S is commonly used for the information reproduction from the DVD and the information reproduction from the CD. FIG. 1A shows a case of the information reproduction from the DVD.

As shown in FIG. 1A, the optical information reproducing apparatus S is provided with a laser diode D, a grating 11, a half mirror M, a collimator lens C, a bifocal lens 10 as one example of a multiple focal lens, a cylindrical lens 12, a photo-detector 13 and a reproduction circuit 14.

As shown in FIG. 1B, the bifocal lens 10 is provided with a diffraction element H, an objective lens R and a main body 10a for holding the diffraction element H and the objective lens R, and is constructed such that the central axis $C_R$ of the objective lens R and the central axis $C_H$ of the diffraction element H. are offset to each other by a distance d, and that the central axis $C_R$ and the central axis $C_H$ are in parallel to each other.

Nextly, the operation of the optical information reproducing apparatus S is explained.

The light beam L emitted from the laser diode D is partially reflected by the half mirror M, is made to be a collimated light by the collimator lens C, and is inputted to the bifocal lens 10. Then, the light beam L is diffracted by the diffraction element H into the 0 order light, the ±1 order lights and the higher order lights. In FIG. 1A, the optical path of the 0 order light $L_0$, which is related to the information reproduction from the DVD 1, is illustrated.

The 0 order light $L_0$ diffracted by the diffraction element H is condensed by the objective lens R onto an information record surface DD of the DVD 1, and is reflected by the information record surface DD. Then, the reflection light passes through the optical path same as that before arriving at the information record surface DD, and is again inputted to the diffraction element H. After that, the reflection light passed through the collimator lens C and is partially transmitted through the half mirror M. Then, after the astigmatism is given to the reflection light by the cylindrical lens 12, the reflection light is inputted to the photo-detector 13, and the light detection signal corresponding to the detected reflection light is outputted therefrom. The light detection signal is inputted to the reproduction circuit 14, where the necessary processes for reproduction such as the D/A (Digital to Analog) conversion, the de-interleave, the decoding, the error correction and so on, are performed with respect the light detection signal, and is outputted as the reproduction output.

Here, the photo-detector 13 is divided into 4 detector portions by dividing lines in a cross ("+") character shape. Among the 4 detector portions, the light detection signals from the 2 detector portions opposed to each other are added to each other to be used for the focus servo control by means of the astigmatism method. On the basis of a signal obtained by adding all detection signals of the 4 detector portions, an RF (Radio Frequency) signal is generated by the reproduction circuit 14, and is outputted as the reproduction output.

On the other hand, as aforementioned, the bifocal lens 10 is constructed such that the central axis $C_R$ of the objective lens R and the central axis $C_H$ of the diffraction element H are offset to each other by the distance d, and that the central axis $C_R$ and the central axis $C_H$ are in parallel to each other. At this time, as for the 0 order light $L_0$, since the diffraction angle of the diffraction element H is 0 degree (namely, it is just a transmitted light), the approaching path and the returning path of the light to and from the information record surface DD are on the same optical path to each other, and the reflection light is inputted to the photo-detector, as shown in FIG. 1A.

Figure 2A:
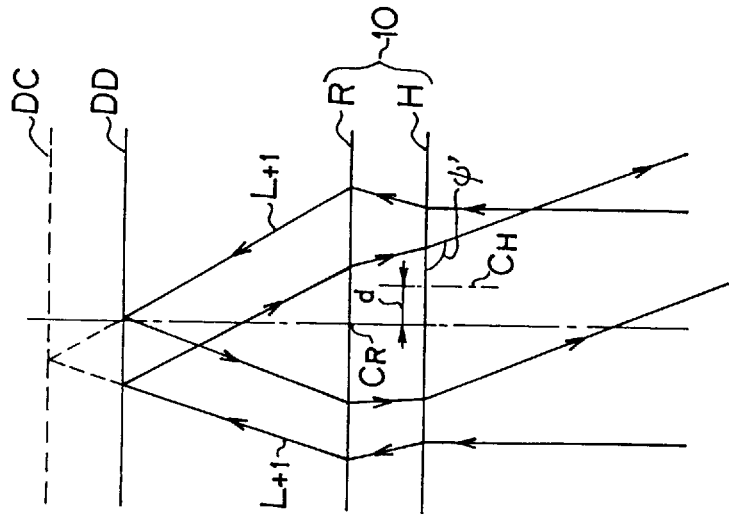
FIG. 2A is a diagram indicating an optical path of the $-1$ order light $L_{-1}$ at a time of reproducing the information from the DVD in the embodiment.
Figure 2B:
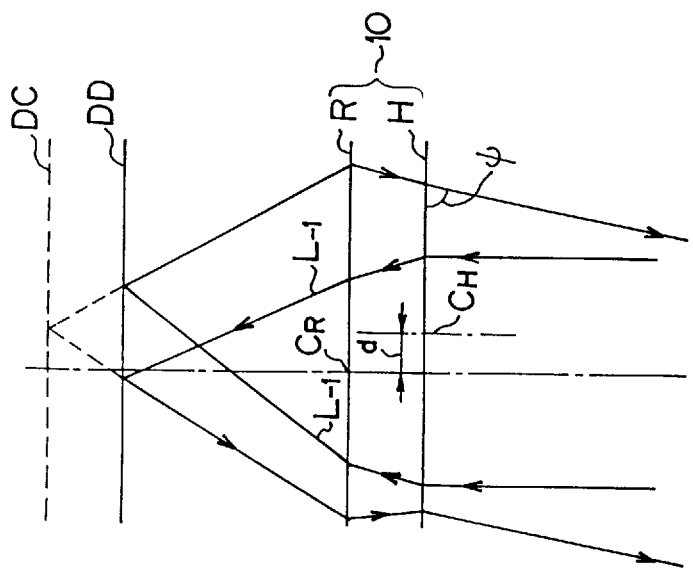
FIG. 2B is a diagram indicating an optical path of the $+1$ order light $L_{+1}$ at a time of reproducing the information from the DVD in the embodiment.

Nextly, the optical paths of the ±1 order lights $L_{-1}$ and $L_{+1}$ diffracted by the diffraction element H in the optical system shown in FIG. 1A, are explained with referring to FIGS. 2A and 2B. In FIGS. 2A and 2B, each of the lens surface of the objective lens R and the diffraction element H is indicated by a single line respectively, for the simplicity of the explanation.

At first, the case of the −1 order light $L_{-1}$ is explained. As shown in FIG. 2A, after the −1 order light $L_{-1}$ diffracted by the diffraction element H is reflected by the information record surface DD, it passes through the same optical path as the reflection light of the +1 order light $L_{+1}$. However, the reflection light of the −1 order light $L_{-1}$ after passing through the diffraction element H is not perpendicular to the diffraction element H as in the case of the 0 order light $L_0$, but is outputted from the diffraction element H by a predetermined angle φ. The reason of this is as follows.

Namely, as shown in FIG. 2A, since the central axis $C_R$ of the objective lens R and the central axis $C_H$ of the diffraction element H are offset to each other by the distance d in the bifocal lens 10, at the time when the −1 order light $L_{-1}$ diffracted by the diffraction element H is inputted to the objective lens R, the relationship between the central axis $C_R$ and the central axis $C_H$ does not become symmetrical, as contrasted to the case where the central axis $C_R$ and the central axis $C_H$ are the same to each other. Therefore, the refraction angle of the −1 order light $L_{-1}$ at the objective lens R does not become symmetrical either with respect the central axis $C_R$. Further, the −1 order light $L_{-1}$ is not condensed or focused onto one point on the information record surface DD of the DVD 1, and is reflected. By those reasons, the optical path of the −1 order light $L_{-1}$ after passing through the diffraction element H does not become perpendicular to the diffraction element H, but is outputted from the diffraction element H by the predetermined angle φ. And that, the irradiation position of the −1 order light $L_{-1}$ on the photodetector 13 is different from that of the 0 order light $L_0$. At this time, in correspondence with the value of the distance d between the central $C_R$ and the central axis $C_H$, it is possible to guide the reflection light of the −1 order light $L_{-1}$ to the outside of the light receiving area of the photo-detector 13.

On the other hand, as for the case of the +1 order light $L_{+1}$, as shown in FIG. 2B, the +1 order light $L_{+1}$ diffracted by the diffraction element H is reflected by the information record surface DD, and passes through the same optical path as the reflection light of the −1 order light $L_{-1}$. The optical path of this reflection light is outputted from the diffraction element H by a predetermined angle φ', which is different from the case of the 0 order light $L_0$. The reason of this is, in the same manner as the case of the −1 order light $L_{-1}$, since the central axis $C_R$ of the objective lens R and the central axis $C_H$ of the diffraction element H are offset to each other by the distance d in the bifocal lens 10 as shown in FIG. 2B, at the time when the +1 order light $L_{+1}$ diffracted by the diffraction element H is inputted to the objective lens R, the incident angle of the +1 order light $L_{+1}$ diffracted by the diffraction element H is not symmetry to the central axis $C_R$ when it is inputted to the objective lens R. Therefore, the refraction angle of the +1 order light $L_{+1}$ at the objective lens R does not become symmetrical either with respect the central axis CR. Further, the +1 order light $L_{+1}$ is not condensed or focused onto one point on the information record surface DD of the DVD 1, and is reflected. By those reasons, the optical path of the +1 order light $L_{+1}$ is different from that of the 0 order light $L_0$, and that, the irradiation position of the +1 order light $L_{+1}$ on the photo-detector 13 is also different from that of the 0 order light $L_0$.

Figure 3:
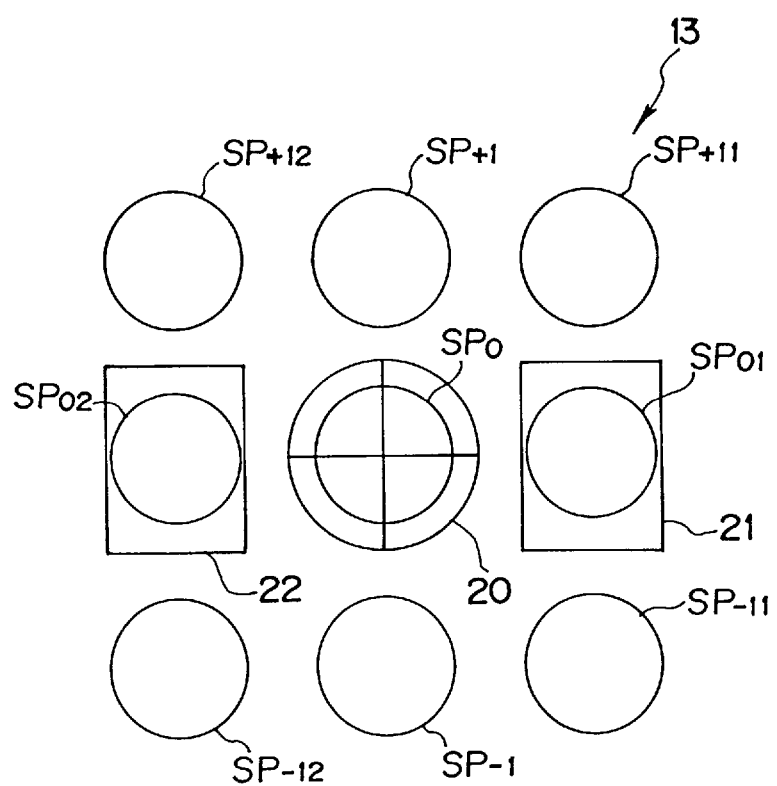
FIG. 3 is a plan view of a photo-detector for showing an irradiation position of each light beam in the embodiment.

Nextly, the irradiation condition of the reflection light of each light beam on the photo-detector 13 is explained with referring to FIG. 3. FIG. 3 shows a light receiving condition in the case of using the 3 beams method as the tracking servo control method for tracking the irradiation position of the light beam L on the information record surface DD to a track formed on the information record surface DD, in which the laser beam L emitted from the laser diode D is separated into two types of light beams i.e. a first light beam, which is used for the generation of the RF signal and for the focus servo control, and second light beams which are used for the tracking servo control, and are inputted to the diffraction element H. Thus, on the photo-detector 13, other than the reflection lights for the generation of the RF signal and the focus servo control, the reflection lights of the light beams used for the tracking servo control are irradiated.

As shown in FIG. 3, the photo-detector 13 for performing the tracking servo control by means of the 3 beams method, is provided with: a main photo-detector 20, which is divided into 4 photo-detector portions, for receiving the reflection light of the light beam used for the generation of the RF signal and the focus servo control; and a sub photo-detectors 21 and 22 for receiving the reflection lights of the light beams used for the tracking servo control. Then, among the reflection light of the 0 order light $L_0$ diffracted by the diffraction element H, the reflection light component used for the generation of the RF signal and the focus servo control is inputted to the main photo-detector 20 to form the main light spot $SP_0$. Among the reflection light of the 0 order light $L_0$, the reflection light components used for the tracking servo control are inputted to the sub photo-detectors 21 and 22 to form the sub light spots $SP_{01}$ and $SP_{02}$, respectively.

In contrast to this, the reflection light of the −1 order light $L_{-1}$ forms the light spot $SP_{-1}$, $SP_{-11}$ and $SP_{-12}$ at the outside of the light receiving areas of the sub photo-detectors 21 and 22, respectively, since the reflection light of the −1 order light $L_{-1}$ passes through the optical path which is different from that of the reflection light of the 0 order light $L_0$ as shown in FIG. 2A. In the same manner, the reflection light of the +1 order light $L_{+1}$ forms the light spot $SP_{+1}$, $SP_{+11}$ and $SP_{+12}$ at the outside of the light receiving areas of the main photo-detector 20 and the sub photo-detectors 21 and 22, respectively, since the reflection light of the +1 order light $L_{+1}$ passes through the optical path which is different from that of the reflection light of the 0 order light $L_0$ as shown in FIG. 2B.

Here, since the predetermined distance d (refer to FIG. 1B) which is the offset distance between the central axis $C_R$ of the objective lens R and the central axis $C_H$ of the diffraction element H, is determined to be such a value that each of the reflection light of the +1 order light $L_{+1}$ and the reflection light of the −1 order light $L_{-1}$ is not inputted to the main photo-detector 20 or the sub photo-detectors 21 and 22 respectively. More concretely, the distance d is set to be about 0.2 mm, for example.

The direction of the offset of the central axis $C_H$ with respect to the central axis $C_R$ is set to be such a direction that each of the reflection light of the +1 order light $L_{+1}$ and the reflection light of the +1 order light $L_{-1}$ is not inputted to the main photo-detector 20 or the sub photo-detectors 21 and 22 respectively, as shown in FIG. 3.

As the method of the tracking servo control, if the push-pull method is employed in which the tracking servo control is performed on the basis of the differential signal between the signals each obtained by adding the light detection signals of the adjacent photo-detector portions of the 4 divided photo-detector portions to each other, there is no need separating the light beam L into 3 beams. Thus, the sub photo-detectors 21 and 22 are not necessary as for the photo-detector 13. Further, in this case, the direction of the offset of the central axis $C_H$ with respect to the central axis $C_R$ may be set to be any direction as long as each of the reflection light of the +1 order light $L_{+1}$ and the reflection light of the +1 order light $L_{-1}$ is not inputted to the light receiving surface of the main photo-detector 20 respectively.

Further, as for the diffracted lights of the higher order lights which are equal to and higher than the ±2 order lights, in the same manner as the −1 order light $L_{-1}$ or the +1 order light $L_{+1}$, they are scattered in directions different from the 0 order light $L_0$, so that the reflection lights of the higher order lights are not inputted to the photo-detector 13.

Figure 4A:
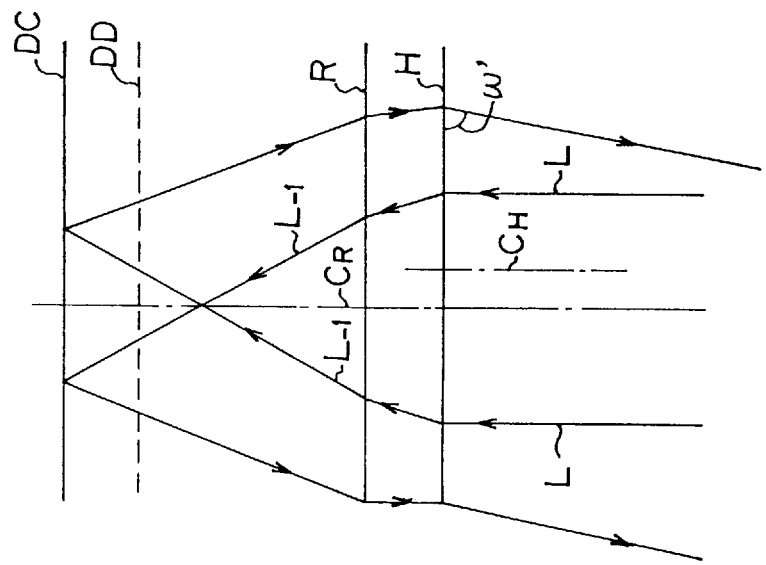
FIG. 4A is a diagram indicating an optical path of the 0 order light $L_0$ at a time of reproducing the information from the CD in the embodiment.
Figure 4B:
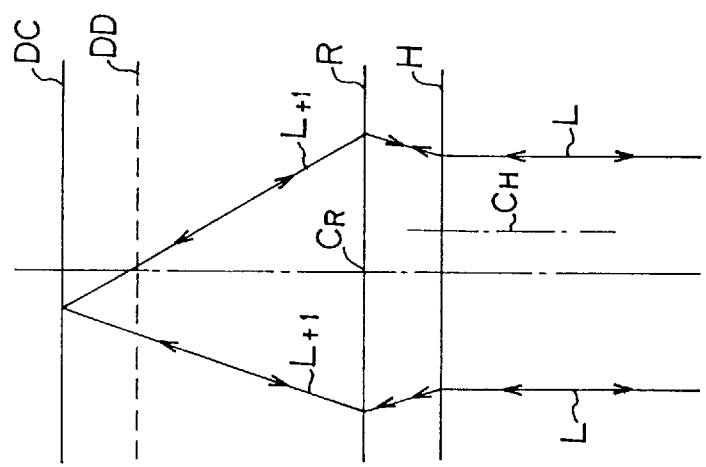
FIG. 4B is a diagram indicating an optical path of the $+1$ order light $L_{+1}$ at a time of reproducing the information from the CD in the embodiment.
Figure 4C:
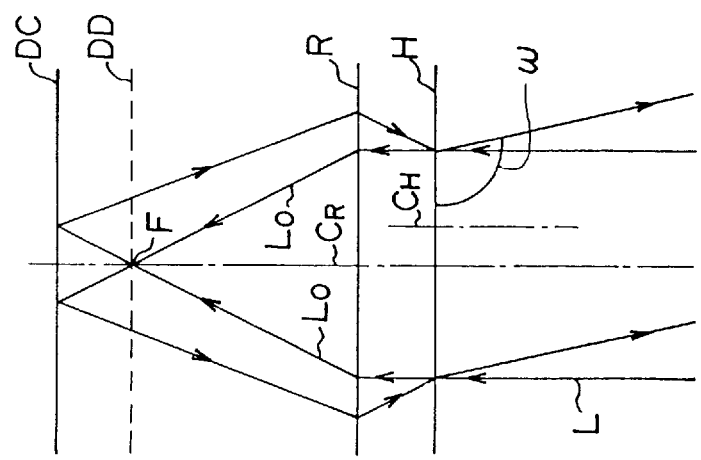
FIG. 4C is a diagram indicating an optical path of the $-1$ order light $L_{-1}$ at a time of reproducing the information from the CD in the embodiment.

Nextly, the operation of reproducing the information recorded on the CD by use of the optical information reproducing apparatus S is explained with referring to FIGS. 4A to 4C. In FIGS. 4A to 4C, the optical paths of the 0 order light $L_0$, and the ±1 order lights $L_{-1}$ and $L_{+1}$ are respectively shown in case of reproducing the information recorded on the CD by use of the information reproducing apparatus S. In FIGS. 4A to 4C, each of the lens surface of the objective lens R and the diffraction element H is indicated by a single line respectively, for the simplicity of the explanation.

At first, as shown in FIG. 4B, the +1 order light $L_{+1}$, which is used for the information reproduction from the CD, is diffracted by the diffraction element H, is reflected by the information record surface DC of the CD, is diffracted again by the diffraction element H, passes through the same optical path before the reflection, and is inputted to the photo-detector 13. On the basis of this inputted light, the generation of the RF signal, the focus servo control and the tracking servo control are performed.

On the other hand, as shown in FIGS. 4A and 4C, the 0 order light $L_0$ and the −1 order light $L_1$ diffracted by the diffraction element H pass straight through the focusing point, are reflected by the information record surface DC of the CD, pass through the optical path of the higher order lights, are diffracted again by the diffraction element H, and are outputted from the diffraction element H by a predetermined angle ω and ω' respectively which are corresponding to the offset distance d between the central axis $C_H$ and the central axis $C_R$. At this time, each of the reflection lights of the 0 order light $L_0$ and the −1 order light $L_{-1}$ outputted from the diffraction element H is not inputted to the main photo-detector 20 or the sub-photo-detectors 21 and 22 of the photo-detector 13. The reason why these reflection lights of the 0 order light $L_0$ and the −1 order light $L_{-1}$ are outputted from the diffraction element H by the predetermined angle ω and ω' is, in the same manner as the case of the information reproduction from the DVD, that the central axis $C_R$ of the objective lens R and the central axis $C_H$ of the diffraction element H are offset to each other in the bifocal lens 10.

Here, in the same manner as the case of the information reproduction from the DVD, the higher order diffraction lights equal to or higher than the ±2 order lights are scattered or outputted in directions different from that of the reflection light of the +1 order light $L_{+1}$. Thus, the irradiation positions on the photodetector 13 of the reflection lights of these higher order lights are different from that of the +1 order light $L_{+1}$.

Figure 5:
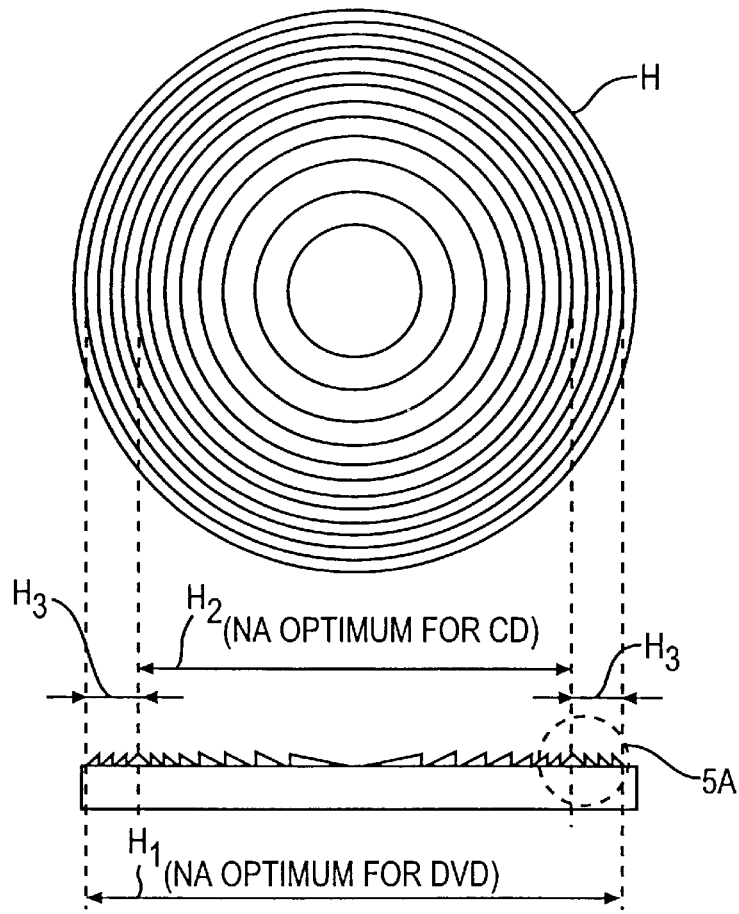
FIG. 5 and FIG. 5A are diagrams for explaining a construction of a diffraction element in the embodiment.

Nextly, the structure of the diffraction element H is explained in detail with referring to FIGS. 5 to 7. The diffraction element H is produced by directly cutting the diffraction surfaces HR and the stepped surfaces HC by means of the mechanical cutting method etc., or by forming a die, which has a shape corresponding to the diffraction surfaces HR and the stepped surfaces HC by means of the mechanical cutting method etc., and molding the material of the diffraction element H such as resin, polymer etc. into the die.

At first, the whole construction of the diffraction element H is explained by use of FIG. 5.

As shown in FIG. 5 showing the plan view and the cross-sectional view, the diffraction element H is provided with: a first diffraction area $H_1$, which has a numerical aperture NA corresponding to the size of the optical spot for the DVD, for transmitting the light beam L and outputting the 0 order light $L_0$ for the DVD; a second diffraction area $H_2$ which is included in the first diffraction area $H_1$ and which has a numerical aperture NA corresponding to the size of the light spot for the CD; and a third diffraction area $H_3$ for adjusting the light intensity of the 0 order light $L_0$ for the DVD.

In the construction explained above, the second diffraction area $H_2$ is an area to generate the +1 order light $L_{+1}$ for forming the light spot on the information record surface of the CD where the diffraction pattern same as the conventional diffraction element i.e. the diffraction pattern of coaxial circle shape in which the diffraction surfaces HR are inclined toward the center direction of the diffraction element H by the stepped surfaces HC.

Figure 5A:
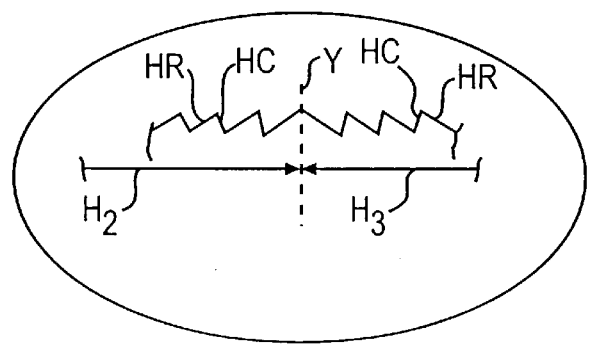

On the other hand, in the third diffraction area $H_3$, for example, the diffraction pattern is formed such that the inclination direction of the diffraction surfaces HR is reverted to the inclination direction of the second diffraction area $H_2$ of the diffraction surface HR at the boundary position Y with the second diffraction area $H_2$ as a center, as shown in the partial cross-sectional and enlarged view in FIG. 5A.

In the construction explained above, by the above described diffraction pattern formed at the third diffraction area $H_3$, the ±1 order lights $L_{+1}$ and $L_{-1}$ are generated from the light beam L inputted thereto. Therefore, on the basis of the diffraction efficiency at the third diffraction area $H_3$, the light intensity of the transmitted light (i.e. the 0 order light $L_0$) is decreased. By this, it is possible to prevent the light intensity of the 0 order light $L_0$ (transmitted light) from drastically changing at the boundary between the third diffraction area $H_3$ and the second diffraction $H_2$. In other words, as compared with the conventional case where the diffraction pattern is not formed in the third diffraction area $H_3$ and that merely a transmission area without any diffraction pattern is formed at the third diffraction area $H_3$, it is possible to prevent the 0 order light $L_0$ from becoming unnecessarily large at the third diffraction area $H_3$, and it is also possible to restrain the side lobe of the 0 order light $L_0$ at the first diffraction area $H_1$ as a whole.

Further, since the inclination direction of the diffraction surface HR of the third diffraction area $H_3$ is in reverse to the central direction of the diffraction element H, most of the higher order diffracted lights generated in the third diffraction area $H_3$ are outputted toward the outer radial side of the diffraction element H, so that the higher order diffracted lights, which are inputted as the stray lights to the focusing position of each light beam on the optical disk (i.e. the DVD or the CD) corresponding to the 0 order light $L_0$ or the +1 order light $L_{+1}$ generated at the second diffraction area $H_2$, is drastically reduced in its light intensity. Consequently, the harmful influence of the higher order diffracted lights onto the information reproduction can be made nil or little.

Figure 6A:
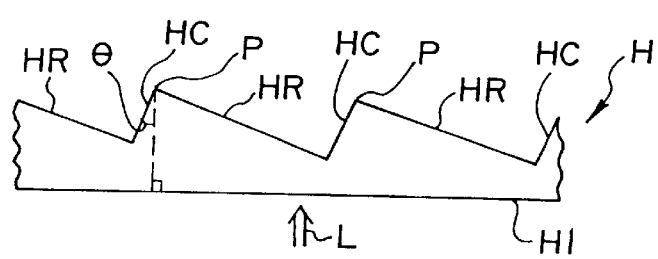
FIG. 6A is a partial cross-sectional and enlarged view of the diffraction element in the embodiment.
Figure 6B:
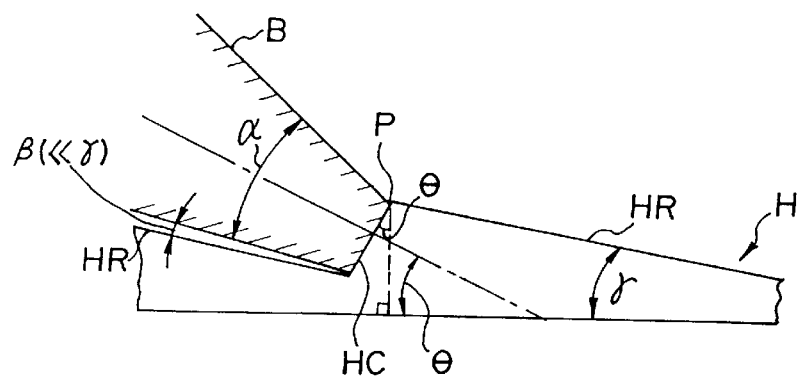
FIG. 6B is a partial cross-sectional and further enlarged view of the diffraction element and a bite at a time of cutting the diffraction element in the embodiment.
Figure 8:
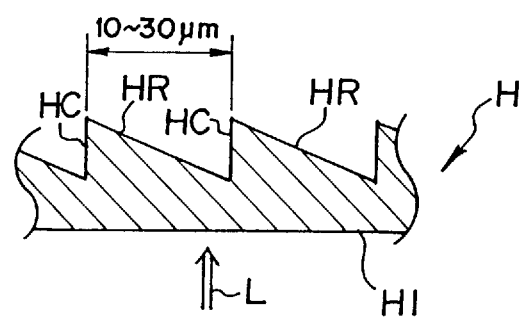
FIG. 8 is a cross-sectional view of a diffraction element.
Figure 10A:
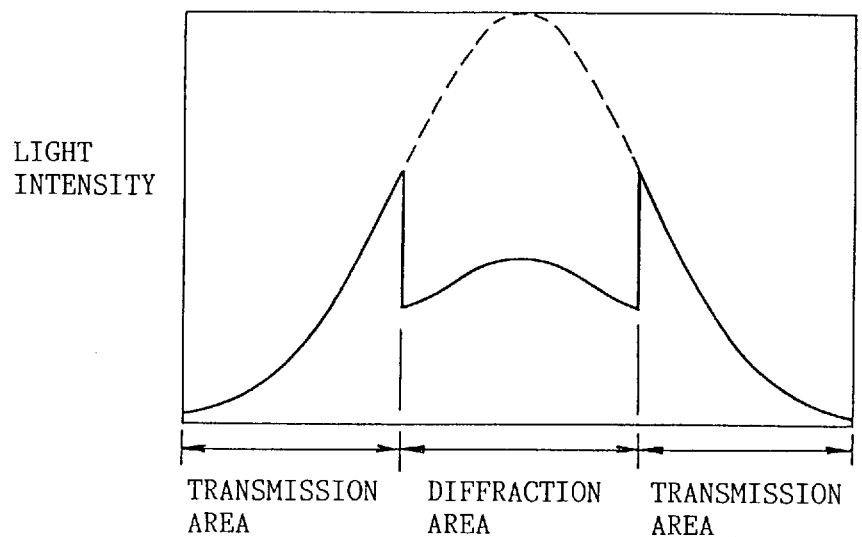
FIG. 10A is a graph showing a relationship between a light intensity in a diffraction area and a transmission area of the 0 order light $L_0$.
Figure 10B:
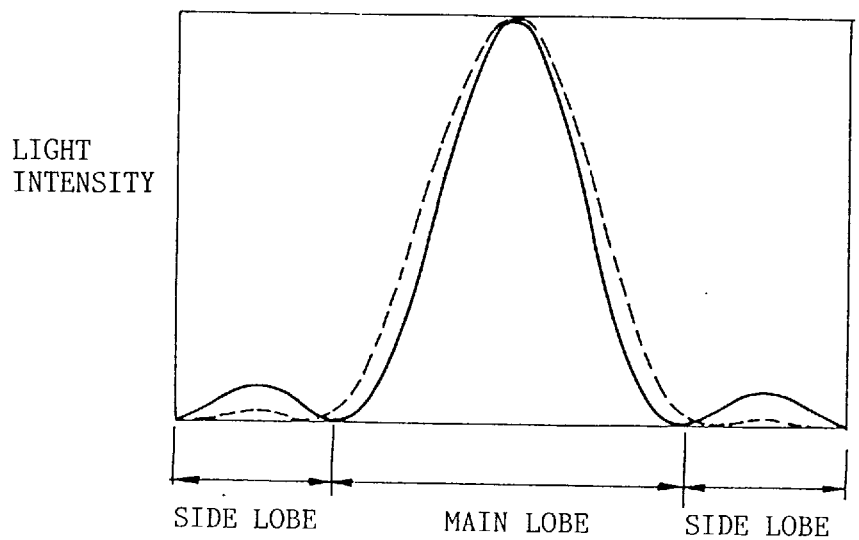
FIG. 10B is a graph showing a relationship between a main beam and a side beam of the light beam in case of the DVD.
Figure 11:
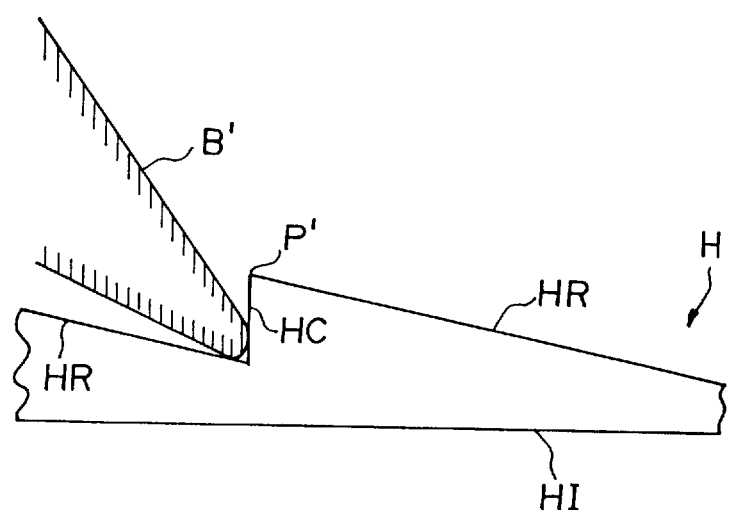
FIG. 11 is a partial cross-sectional and enlarged view of the diffraction element and a bite at a time of cutting the diffraction element of FIG. 11.

Nextly, the detailed structure of the diffraction pattern of the diffraction element H is explained by use of FIGS. 6A and 6B.

As shown in FIG. 6A, the diffraction element H is constructed such that each of the stepped surfaces HC has an angle θ with respect to a vertical line, which is drawn from a protruding portion P of the saw-tooth shape perpendicular toward the incident surface HI (which is formed in a plane shape) to which the light beam L is incident. This angle θ is concretely set to be such a value that the diffraction efficiencies of the 0 order light $L_0$ and the +1 order light $L_{+1}$ used for the information reproduction from the DVD and the CD are respectively high while the diffraction efficiency of the -1 order light $L_{-1}$ not used for the information reproduction is low. Here, the relationship between the 0 order light $L_0$ and the +1 order light $L_{+1}$ and the -1 order light $L_{-1}$ in case of changing the angle θ is, according to an experiment, as shown in FIG. 7. Therefore, in the case shown in FIG. 7, the angle θ is set in the range of 10° to 50° in accordance with the above explained conditions.

Nextly, the relationship between the bite B and the stepped surface HC at the time of forming the diffraction element H having the cross-sectional profile shown in FIG. 6A, is shown in FIG. 6B.

As shown in FIG. 6B, at the time of forming the diffraction element H by means of the mechanical cutting method, the bite B which tip is plane is utilized. The angle α of the tip portion of the bite B is in a range of 40° to 50°, and preferably, about 45°, for example. At this time, the angle γ which is formed by the diffraction surface HR and the incident surface HI is about 3° at the maximum. The angle β, which is formed by the diffraction surface HR and the bite B adjacent to each other at the time of cutting is set to be sufficiently small relative to the angle γ (i. e., β<<γ), and is about 0.50°, for example. Thus, the value of the angle θ is obtained by a following expression.

$$\theta = \alpha/2 + \beta + \gamma$$

For example, it is preferably set to about 30°

As explained above, according to the present embodiment, since the central axis CR of the objective lens R and the central axis CH of the diffraction element H are offset by the predetermined distance d to each other and are in parallel to each other, the reflection lights of the +1 order light $L_{+1}$ and the -1 order light $L_{-1}$ and their higher order lights, which are not used for the reproduction, are not irradiated to the light receiving surface of each photodetector, at the time of reproducing the DVD. Thus, in the reproduced signal based on the 0 order light $L_0$, it is possible to exclude the harmful influence of the reflection lights of the +1 order light $L_{+1}$ and the -1 order light $L_{-1}$ and their higher order lights. Accordingly, the precise information reproduction can be performed with little noise, and it is possible to stabilize the servo operation based on the reflection light of the 0 order light $L_0$.

The diffraction element H is provided with the second diffraction area $H_2$ and the third diffraction area $H_3$ which are different in the diffraction pattern from each other, and each diffraction surface HR is formed so that the light intensity of the 0 order light $L_0$ for the DVD is not drastically changed at the boundary between the second diffraction area $H_2$ and the third diffraction area $H_3$. Thus, the side lobe of the 0 order light $L_0$ can be reduced at the time of reproducing the DVD.

Further, since the diffraction element H is constructed such that the stepped surface HC has the angle θ with respect to the vertical line standing from the incident surface HI, it is not necessary to employ a bite which tip portion is sharpened at the time of forming the diffraction element H, and that it is possible to reduce the possibility of breaking or cracking the tip portion of the bite, resulting in the improvement in the safety and the efficiency of the production operation of the diffraction element H.

Furthermore, since the protruding portion P is not sharpened at the tip thereof, it is possible to reduce the breakage of the diffraction element H.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A multiple focal lens comprising:

a diffraction element having a light incident surface and a light outgoing surface for diffracting a light beam incident from the external to the light incident surface and generating a plurality of diffraction light beams from the light outgoing surface;

a light condense element for condensing the generated diffraction light beams respectively onto a plurality of focal points different in position from each other; and a main body for holding said diffraction element and said light condense element, a central axis of said diffraction element and a central axis of said light condense element being offset to each other such that one optical path of one reflection light, which is used for reproducing information, among a plurality of reflection lights of the condensed diffraction light beams reflected from an information record medium on which the information to be reproduced is recorded, and the other optical paths of the other reflection lights among the plurality of reflection lights are offset to each other.

2. A multiple focal lens according to claim 1, wherein said information record medium is a DVD (Digital Video or Versatile Disk).

3. A multiple focal lens according to claim 1, wherein the central axis of said diffraction element is offset to the central axis of said light condense element such that irradiation positions of the other reflection lights are outside of a light receiving area of an external light receiving means for receiving said one receiving light.

4. A multiple focal lens according to claim 1, wherein said diffraction element comprises, at the light outgoing surface, a plurality of diffraction surfaces and a plurality of stepped surfaces respectively connecting said plurality of diffraction surfaces, such that a cross-sectional profile of the light outgoing surface is in a saw-tooth shape, each of said stepped surfaces being inclined, in the cross-sectional profile, around a protruding portion of the sawtooth shape as a center respectively in a direction opposite to one of the diffraction surfaces connected to each of said stepped surfaces at the protruding portion, such that an angle between a straight line, which is included in each of said stepped surface passing through the protruding portion, and a straight line perpendicular to the light incident surface is a predetermined angle $\theta$ ($\theta > 0$).

5. A multiple focal lens according to claim 1, wherein said light condense element condenses the generated plurality of light beams onto two focal points.

6. A multiple focal lens comprising:

a diffraction element having a light incident surface and a light outgoing surface for diffracting a light beam incident from an external location to the light incident surface and generating a plurality of diffraction light beams from the light outgoing surface;

a light condense element for condensing the generated diffraction light beams respectively onto a plurality of focal points different in position from each other; and a main body for holding said diffraction element and said light condense element, said diffraction element comprising: a first diffraction area having a size corresponding to a numerical aperture for reproducing information from a first information record medium, on which the information to be reproduced from the first information record medium is recorded; a second diffraction area included in said first diffraction area and having a size corresponding to a numerical aperture for reproducing information from a second information record medium, on which the information to be reproduced from the second information record medium is recorded and which distance from an external surface thereof to an information record surface thereof is different from that of said first information record medium; and a third diffraction area, which is other than said second diffraction area in said first diffraction area, said second and third diffraction areas having diffraction patterns different from each other such that a light intensity difference between a light intensity of a diffraction light, which is generated from said third diffraction area and which is used for reproducing the information from said first information record medium, and a light intensity of a diffraction light, which is generated from said second diffraction area, is smaller than a predetermined value which gives an influence on reproducing the information from said first information record medium, the diffraction patterns of said second and third diffraction areas are concentric with respect to a central axis of said diffraction element, an inclination direction of the diffraction pattern of said second diffraction area is directed toward the central axis, and an inclination direction of the diffraction pattern of said third diffraction area is directed away from the central axis.

7. A multiple focal optical pickup comprising:

a multiple focal lens;

a light emitting means for emitting a light beam and irradiating an information record medium, on which the information to be reproduced is recorded, with the emitted light beam through said multiple focal lens; and a light receiving means for receiving a reflection light from said information record medium through said multiple focal lens, and generating a light detection signal corresponding to the received reflection light, said multiple focal lens comprising:

a diffraction element having a light incident surface and a light outgoing surface for diffracting the emitted light beam incident to the light incident surface and generating a plurality of diffraction light beams from the light outgoing surface;

a light condense element for condensing the generated diffraction light beams respectively onto a plurality of focal points different in position from each other; and a main body for holding said diffraction element and said light condense element, a central axis of said diffraction element and a central axis of said light condense element being offset to each other such that one optical path of one reflection light, which is used for reproducing information, among a plurality of reflection lights of the condensed diffraction light beams reflected from the information record medium, and the other optical paths of the other reflection lights among the plurality of reflection lights are offset to each other.

8. A multiple focal optical pickup according to claim 7, wherein said information record medium is a DVD (Digital Video or Versatile Disk).

9. A multiple focal optical pickup according to claim 7, wherein the central axis of said diffraction element is offset to the central axis of said light condense element such that irradiation positions of the other reflection lights are outside of a light receiving area of said light receiving means for receiving said one receiving light.

10. A multiple focal optical pickup according to claim 7, wherein said diffraction element comprises, at the light outgoing surface, a plurality of diffraction surfaces and a plurality of stepped surfaces respectively connecting said plurality of diffraction surfaces, such that a cross-sectional profile of the light outgoing surface is in a saw-tooth shape, each of said stepped surfaces being inclined, in the cross-sectional profile, around a protruding portion of the sawtooth shape as a center respectively in a direction opposite to one of the diffraction surfaces connected to each of said stepped surfaces at the protruding portion, such that an angle between a straight line, which is included in each of said stepped surface passing through the protruding portion, and a straight line perpendicular to the light incident surface is a predetermined angle $\theta$ ($\theta>0$).

11. A multiple focal optical pickup according to claim 7, wherein said light condense element condenses the generated plurality of light beams onto two focal points.

12. A multiple focal optical pickup comprising:

a multiple focal lens;

a light emitting means for emitting a light beam and irradiating either one of a first information record medium, on which information to be reproduced from the first information record medium is recorded, and a second information record medium, on which information to be reproduced from the second information record medium is recorded and which distance from an external surface thereof to an information record surface thereof is different from that of said first information record medium, with the emitted light beam through said multiple focal lens; and a light receiving means for receiving a reflection light from said either one of first and second information record mediums through said multiple focal lens, and generating a light detection signal corresponding to the received reflection light, said multiple focal lens comprising:

a diffraction element having a light incident surface onto which the emitted light beam is incident and a light outgoing surface for diffracting the emitted light beam incident to the light incident surface and generating a plurality of diffraction light beams from the light outgoing surface;

a light condense element for condensing the generated diffraction light beams respectively onto a plurality of focal points different in position from each other; and a main body for holding said diffraction element and said light condense element, said diffraction element comprising: a first diffraction area having a size corresponding to a numerical aperture for reproducing the information from said first information record medium; a second diffraction area included in said first diffraction area and having a size corresponding to a numerical aperture for reproducing the information from said second information record medium; and a third diffraction area, which is other than said second diffraction area in said first diffraction area, said second and third diffraction areas having diffraction patterns different from each other such that a light intensity difference between a light intensity of a diffraction light, which is generated from said third diffraction area and which is used for reproducing the information from said first information record medium, and a light intensity of a diffraction light, which is generated from said second diffraction area, is smaller than a predetermined value which gives an influence on reproducing the information from said first information record medium, the diffraction patterns of said second and third diffraction areas are concentric with respect to a central axis of said diffraction element, an inclination direction of the diffraction pattern of said second diffraction area is directed toward the central axis, and an inclination direction of the diffraction pattern of said third diffraction area is directed away from the central axis.

13. An optical information reproducing apparatus comprising:

a multiple focal lens;

a light emitting means for emitting a light beam and irradiating an information record medium, on which the information to be reproduced is recorded, with the emitted light beam through said multiple focal lens;

a light receiving means for receiving a reflection light from said information record medium through said multiple focal lens, and generating a light detection signal corresponding to the received reflection light; and a reproduction means for reproducing the information on the basis of the generated light detection signal, said multiple focal lens comprising:

a diffraction element having a light incident surface and a light outgoing surface for diffracting the emitted light beam incident to the light incident surface and generating a plurality of diffraction light beams from the light outgoing surface;

a light condense element for condensing the generated diffraction light beams respectively on to a plurality of focal points different in position from each other; and a main body for holding said diffraction element and said light condense element, a central axis of said diffraction element and a central axis of said light condense element being offset to each other such that one optical path of one reflection light, which is used for reproducing information, among a plurality of reflection lights of the condensed diffraction light beams reflected from the information record medium, and the other optical paths of the other reflection lights among the plurality of reflection lights are offset to each other.

14. An optical information reproducing apparatus according to claim 13, wherein said information record medium is a DVD (Digital Video or Versatile Disk).

15. An optical information reproducing apparatus according to claim 13, wherein the central axis of said diffraction element is offset to the central axis of said light condense element such that irradiation positions of the other reflection lights are outside of a light receiving area of said light receiving means for receiving said one receiving light.

16. An optical information reproducing apparatus according to claim 13, wherein said diffraction element comprises, at the light outgoing surface, a plurality of diffraction surfaces and a plurality of stepped surfaces respectively connecting said plurality of diffraction surfaces, such that a cross-sectional profile of the light outgoing surface is in a saw-tooth shape, each of said stepped surfaces being inclined, in the cross-sectional profile, around a protruding portion of the sawtooth shape as a center respectively in a direction opposite to one of the diffraction surfaces connected to each of said stepped surfaces at the protruding portion, such that an angle between a straight line, which is included in each of said stepped surface passing through the protruding portion, and a straight line perpendicular to the light incident surface is a predetermined angle $\theta$ ($\theta>0$).

17. An optical information reproducing apparatus according to claim 13, wherein said light condense element condenses the generated plurality of light beams onto two focal points.

18. An optical information reproducing apparatus comprising:

a multiple focal lens;

a light emitting means for emitting a light beam and irradiating either one of a first information record medium, on which information to be reproduced from the first information record medium is recorded, and a second information record medium, on which information to be reproduced from the second information record medium is recorded and which distance from an external surface thereof to an information record surface thereof is different from that of said first information record medium, with the emitted light beam through said multiple focal lens;

a light receiving means for receiving a reflection light from said either one of first and second information record mediums through said multiple focal lens, and generating a light detection signal corresponding to the received reflection light; and a reproduction means for reproducing information based on the generated light detection signal, said multiple focal lens comprising:

a diffraction element having a light incident surface onto which the emitted light beam is incident and a light outgoing surface for diffracting the emitted light beam incident to the light incident surface and generating a plurality of diffraction light beams from the light outgoing surface;

a light condense element for condensing the generated diffraction light beams respectively onto a plurality of focal points different in position from each other; and a main body for holding said diffraction element and said light condense element, said diffraction element comprising: a first diffraction area having a size corresponding to a numerical aperture for reproducing the information from said first information record medium; a second diffraction area included in said first diffraction area and having a size corresponding to a numerical aperture for reproducing the information from said second information record medium; and a third diffraction area, which is other than said second diffraction area in said first diffraction area, said second and third diffraction areas having diffraction patterns different from each other such that a light intensity difference between a light intensity of a diffraction light, which is generated from said third diffraction area and which is used for reproducing the information from said first information record medium, and a light intensity of a diffraction light, which is generated from said second diffraction area, is smaller than a predetermined value which gives an influence on reproducing the information from said first information record medium, the diffraction patterns of said second and third diffraction areas are concentric with respect to a central axis of said diffraction element an inclination direction of the diffraction pattern of said second diffraction area is directed toward the central axis, and an inclination direction of the diffraction pattern of said third diffraction area is directed away from the central axis.

* * * * *